United States Patent [19]

Boutaleb et al.

[11] Patent Number: 4,536,014
[45] Date of Patent: Aug. 20, 1985

[54] INDENTIFICATION OF ARTICLES USING LIQUID CRYSTAL IDENTITY CARDS

[75] Inventors: Lucy A. Boutaleb; Aboubekr Boutaleb; Tibor T. Kerekess, all of London, England

[73] Assignee: Securicard Systems Limited, Edinburgh, Scotland

[21] Appl. No.: 414,535

[22] PCT Filed: Jan. 4, 1982

[86] PCT No.: PCT/GB82/00001
§ 371 Date: Aug. 24, 1982
§ 102(e) Date: Aug. 24, 1982

[87] PCT Pub. No.: WO82/02445
PCT Pub. Date: Jul. 22, 1982

[30] Foreign Application Priority Data

Jan. 8, 1981 [GB] United Kingdom ................. 8100492

[51] Int. Cl.³ .................. G02F 1/133; G03B 21/00; G06K 9/74; C09K 3/34
[52] U.S. Cl. ................. 283/83; 350/331 R; 350/334; 353/122; 356/71; 428/1
[58] Field of Search .............. 350/331 R, 334, 341; 283/72, 83, 86, 89, 87, 904, 901; 428/1; 353/65, 122; 356/71

[56] References Cited

U.S. PATENT DOCUMENTS

| 3,674,338 | 8/1970 | Cartmell et al. | 350/331 R |
| 3,787,110 | 1/1974 | Berreman | 350/341 |
| 4,105,313 | 8/1978 | Altman | 350/331 R |
| 4,171,864 | 10/1979 | Jung . | |
| 4,175,775 | 11/1979 | Kruegle . | |
| 4,189,353 | 2/1980 | Harriman | 283/87 |
| 4,410,887 | 10/1983 | Stolov et al. | 350/344 |

FOREIGN PATENT DOCUMENTS 2054473 5/1972 Fed. Rep. of Germany .

OTHER PUBLICATIONS

Electronic Applications Bulletin, vol. 35, No. 3, May 1978, "Liquid Crystal Displays"-Part 1, pp. 136 to 144, see Chapter Twisted Neumatic, p. 139.

Primary Examiner—John K. Corbin
Assistant Examiner—David Lewis
Attorney, Agent, or Firm—Keil & Weinkauf

[57] ABSTRACT

An identification article, especially an identity document, has a marked element (8), e.g. a photograph covered by a mask (2) which is normally opaque but which, upon application of a suitable electric field changes to an at least translucent state. Preferably the mask (2) complies a liquid crystal layer (16) sandwiched between two plates (5 and 7) of which one plate is at least translucent.

6 Claims, 13 Drawing Figures

INDENTIFICATION OF ARTICLES USING LIQUID CRYSTAL IDENTITY CARDS

The use of credit cards is very widespread. Unfortunately, besides their advantages, the traditional credit cards also have serious disadvantages; in the case of lost or stolen cards the owners are not protected against illegal use. This causes irritation and worry to the owner and financial loss both to the owner and to the issuing bank.

On the traditional credit cards the identification marks (code numbers, signature, etc.) are visible and, therefore can be easily forged. To prevent this happening various methods have been devised which make unauthorized use difficult or near impossible. Some of these methods have been based on invisible markings. However, in the majority of cases these methods do not give the required protection (e.g. the markings readily can be made visible with equipment available in most households) or are only suitable for simple designs. The presently available methods which may give greater protection are often very complicated, difficult to produce, can be used only once and are expensive. Hence their limited use.

The object of the present invention is to provide means to ensure the necessary protection, against misuse of identity documents such as credit cards, security passes and the like, by making invisable even the most complicated designs, which cannot readily be made visible domestically, and which are at the same time cheap, simple and available for unlimited use.

According to a first aspect of the present invention, there is provided an identifiable article, comprising an element bearing markings, and a mask permanently overlying said markings and normally opaque so as to obscure said markings from view, the mask being of a material which, upon the application of a suitable electric field, changes from an opaque state to an at least translucent state whereby the said markings can be viewed. It is preferred that in said translucent state, the mask is transparent.

Usually, but not necessarily, the identifiable article of the invention is an identity document such as credit card, identification card, security pass or the like. The invention has especial application to identity documents in the form of flat laminated cards.

The marked element may be opaque, in which case the markings are viewed by reflection. Alternatively, the marked element may be at least translucent, preferably transparent, for viewing of the markings either by reflection or by transmission.

The change of the mark from its opaque state to its translucent state preferably is obtained by the use in the mask of a blocking material which causes a rotation of the axis of polarized light, and which undergoes a change of polarization when energised by the electric field. In such a case, the article of the invention preferably includes polarizing screen means for the purpose of obtaining cut-off when the angles of polarization are not appropriate.

In a preferred form the blocking material is a liquid-crystal substance as used in liquid-crystal displays. These substances are organic compounds with rod-like molecules. Their state depends on their composition and temperature; being liquified at high temperature, but before reaching a certain temperature (usually 80°–90° C.) the liquid has a definite crystalline structure. At these temperatures, these compounds also display certain specific optical and electrical properties (mesomorphic phase) which make their use as blocking material feasible.

The mesomorphic liquid-crystals used as blocking material can be classified into three groups, namely nematic, smectic and cholesteric liquid-crystals Nematic liquid crystals consist of long, threadlike or rod-like molecules. The compounds behave differently in an electric field and in a neutral field according to the angle between the molecular axis and the electric moment. In the liquid-crystalline state the molecular axes are parallel to each other. Typical nematic compounds include p-ethoxybenzylidene-p-aminobenzonitrile (PEBAB), ansylidene-p-aminophenylacetate (APAPA), and p-anoxyanisole.

Smectic liquid-crystals have molecules more regularly arranged than in nematic compounds. Thick, cigar-shaped molecules congregate in mononuclear layers parallel to each other, but vertical to the planes of the layers, similar to soap molecules. The molecules are arranged in layers in a random fashion. A typical smectic compound is p-azoxybenzoate.

Cholesteric liquid-crystals are mainly cholesterol derivatives (although cholesterol itself does not have liquid-crystalline properties) with a regularly layered structure wherein the molecular axes are parallel not only to each other, but also to the planes of the mononuclear layers, making the layers extremely thin. At the same time, there is a certain degree (1–20 min) of divergence between the molecular axes of one layer and those of the next layer due to an interference between the layers. This divergence creates a spiral-like structure in the successive layers because after every few hundred layers the direction of the molecular axes returns to its starting position. This molecular structure makes the compounds extremely active optically (rotating the plane of polarized light) and a 1 mm thick cholesteric liquid-crystal layer may rotate the plane of polarized light by 18000°.

Depending upon whether the illumination and viewing of the image (i.e markings) are on the same or opposite sides, the viewing operation is either reflective or transmissive. The mode of operation depends not on the type of mask used, but on the image-bearing material (transparent or reflective). For example, a dia-picture between a transparent protective plate of, for example, glass or plexiglass and a mask placed in a homogeneous electric field can be viewed from the opposite side (transmissive operation). The viewing can be direct or indirect; the latter in the case of magnification or projection. Naturally, the magnification or projection makes the identification of the smaller details of the image that much easier.

The energization of the mask requires an adequately strong homogeneous electric field which can easily be obtained between two parallel flat electrodes. The necessary electric field, depending on the material of the liquid-crystal employed, is $E = 50\text{--}200$ V/mm. The strength of the field between the electrodes depends on the voltage of the electrodes and the distance between them: $E = V/d$ where $E$ is the electric field, $V$ is the voltage of the electrodes and $d$ is the distance.

For identification, the credit card (or other document) is placed between the electrodes. In the case of reflective operation, only one of the electrodes must be transparent, but in the case of transmissive operation both electrodes must be transparent. Suitably, the electrode is a layer fixed onto a transparent plate, such as glass or plexiglass, by steaming. The necessary voltage is provided by a high frequency, high voltage transitor inverter (not an alternating-current adaptor). In this case the control apparatus can be operated from electric outlets or by battery.

According to a second aspect of the invention, there is provided an identity system comprising an identity document in the form of a flat laminated card and a viewer therefor, said viewer comprising a spaced pair of plate electrodes, means for supporting any of the said identity documents between said electrodes, and means for applying an electrical field to the electrodes to energise the mask of said document to change from its opaque to its at least translucent state, one at least of said electrodes being at least translucent whereby the revealed markings in the document can be viewed through said electrode.

According to a third aspect of the invention there is provided a viewer, for use with the identifiable article of the first aspect, which viewer comprises a housing, means for supporting said article inserted therein, electrodes adjacent to the supporting means and one at least of which is at least translucent and means for applying an electrical field to the electrodes to energise the mask of said article to change from its opaque to its at least translucent state whereby the markings of the article can be seen. Preferably, said at least translucent electrode is transparent. Means may be included to project light onto the identifiable article, and an optical system may be included for magnified viewing and/or focussing.

In order that the nature of the invention may be readily ascertained, some embodiments in accordance therewith are hereinafter particularly described with reference to the figures of the accompanying drawings. In the drawings:

FIG. 7b is a cross-section on the line VIIb-VIIb of FIG. 7a;

In brief, there are provided by the illustrated embodiments credits card and a viewer. On the cards the identification marks (photographs, signatures, code numbers) are covered by a special mask. In its normal state, this mask is not transparent to any kind of light. However, if it is placed in an electric field, in such a way that the direction of the energy is vertical to the plane of the mask, the element becomes transparent. The mask can also be used for covering relatively large areas (photographs, signatures, long code numbers, fingerprints, etc.).

A suitable homogenous electric field is provided by the viewer, which also has an additional device which makes unauthorised use impossible. The viewer is simple, small and easy to operate anywhere where its use is required (banks, shops, etc.).

Figure 1:
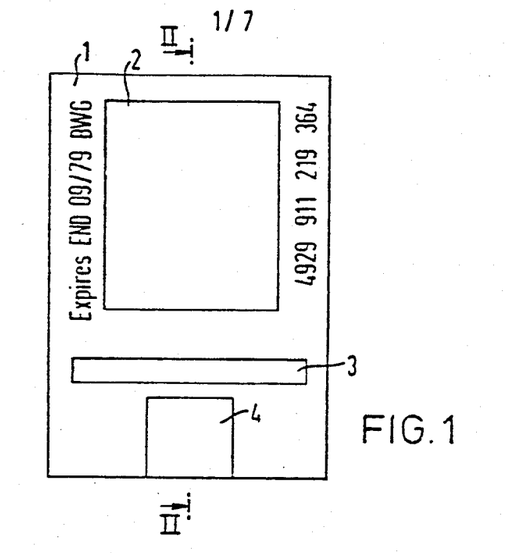
FIG. 1 is a front elevation of a credit card for reflective viewing.
Figure 2:
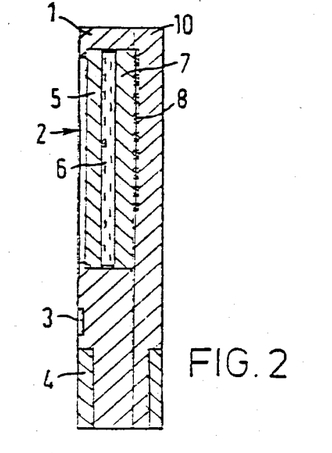
FIG. 2 is a cross-section on the line II—II of FIG. 1.
Figure 3:
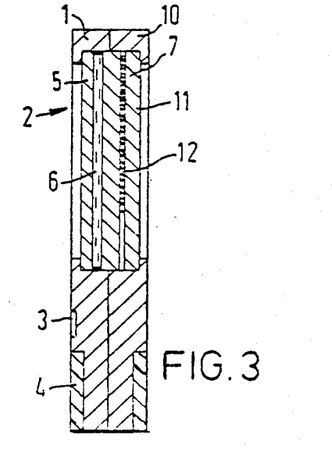
FIG. 3 is a cross-section corresponding to FIG. 2 of a modification of the credit card of FIG. 1 for "transmissive" and/or of "reflective" viewing.

Referring to FIGS. 1 and 2, there is shown a credit card comprising a front sheet 1, a mask 2, an element 8 bearing information, e.g. a photograph and a back sheet 10. The front sheet carries a magnetisable layer 3 for magnetic storage and a grooved part 4. The mask 2 has a front plate 5, a liquid crystal layer 6, and a back plate 7. FIG. 3 shows a modification of the credit card of FIGS. 1 and 2 in which the element 8 is replaced by a transparent element 11, e.g. a diapositive covered by a transparent protective sheet 12, and the back sheet 10 has an aperture through which the element 11 can be viewed.

The layer 6 is a 10–20 μm thick nematic liquid-crystalline layer and the plates 5, 7 are both transparent polarizing plates having their planes of polarization aligned. The inner surfaces of the plates 5, 7 abut transparent plates 21, 22 having in their inner surfaces fine parallel grooves arranged such that the parallel grooves of plate 21 extend perpendicularly to those of plate 22 (see FIGS. 7a and 7b). Immediately adjacent the plates 21, 22, the molecules of the liquid-crystal layer 6 are arranged according to the direction of said grooves due to interference between the plates and the molecules. Further from the plates the direction of the molecular axes changes gradually towards the direction of the grooves of the other plate due to the interference between the molecules. This artificially enforced structure is similar to that of the cholesteric liquid-crystals without mononuclear layers. The divergence between the molecular axes immediately adjacent the two opposite plates is 90° with continuous divergence between them.

The result is the layer 6 has the so-called "twisted-nematic liquid-crystal" structure which rotates the plane of the polarized light by 90°. The non-energized element is not transparent to light because the polarized light produced by the top plate 5 is rotated by 90° by the "twisted-nematic liquid-crystal" layer and the bottom plate 7 transmits only parallel rays. The result is exactly the same if the element is turned upside down. On the other hand, if the element is placed in a vertical homogeneous field the twisted structure disappears because the molecules turn toward the direction of the field with their electric dipole moment. In consequence the layer between the plates 21, 22 does not rotate the plane of the polarized light which can penetrate the bottom plate 7 without hindrance and thus the element becomes transparent. Depending upon whether the information covered by the element is transparent as in FIG. 3 (diapicture) or not as in FIG. 2 (paper picture) the system can operate by transmissive and/or reflective operation.

A credit card as shown in FIGS. 1 and 2 can be based on a synthetic plastics back sheet 10 on which a photograph 8 of the owner is pasted. At the bottom of the photograph 8 a blank space is provided for the signature. The photograph 8 and the back sheet 10 are stamped together (ink or pressing) by the issuing bank in such a way that half of the stamp is on the photograph and the other half is on the back sheet. Besides the signature a specific code number is also added. The mask 2 is fixed on the back sheet 10 by, for example, strong adhesive so that it covers the photograph, signature and code number and cannot be removed without severe damage. Above the mask, the front sheet 1 is attached by, for example strong adhesive to protect the card from mechanical damage. This sheet 1 bears the number of the card, date of expiration, and the name of the owner. The thus-prepared card is placed in a synthetic transparent wallet for extra protection. The thickness of such a card is not more than four times greater than that of traditional credit cards, which should not cause any inconvenience. It is expected that production versions of the card will be of substantially the same thickness as tradional credit cards. Magnetic data can be provided at the layer 3 as and when required.

Figure 5:
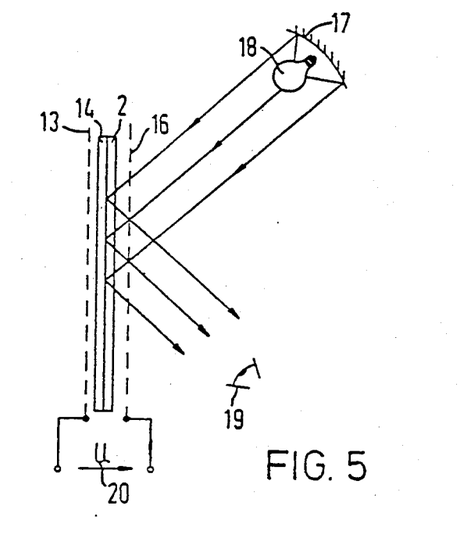
FIG. 5 is a schematic side view to illustrate "reflective" viewing of the credit cards of FIGS. 1 and 2 and FIG. 3.

FIG. 5 shows how the credit cards of FIGS. 1 and 2 and FIG. 3 can be viewed by "reflective" viewing. In FIG. 5, 2 is the mask, 13 is an electrode, 14 is the element 8 of the credit card of FIGS. 1 and 2 or the element 11 of the credit card of FIG. 3, 16 is a transparent electrode, 17 is a mirror, 18 is a light source, 19 is the eye of the viewer, and 20 is the energising voltage applied.

Figure 6:
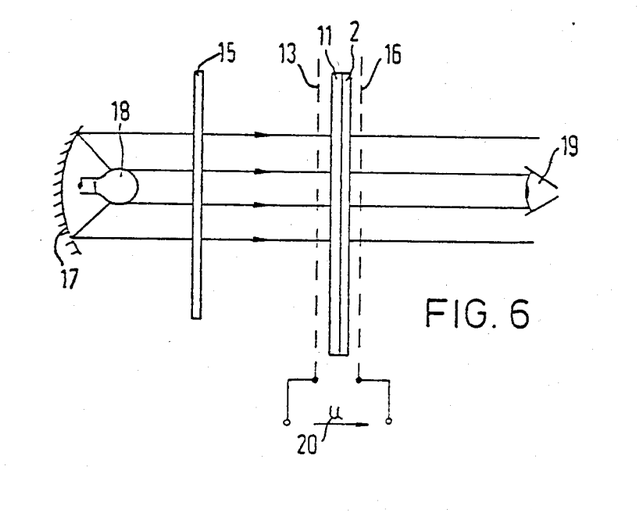
FIG. 6 is a schematic side view illustrating "transmissive" viewing of the credit card of FIG. 3.

FIG. 6 shows how the credit card of FIG. 3 can be viewed by "transmissive" viewing. The same reference numerals are used in FIG. 6 as those of FIG. 5 to identify the same components and in addition 15 is a translucent glass plate. Further, in FIG. 6 the electrode 13 must be translucent whereas in FIG. 5 it cam be opaque.

Figure 7A:
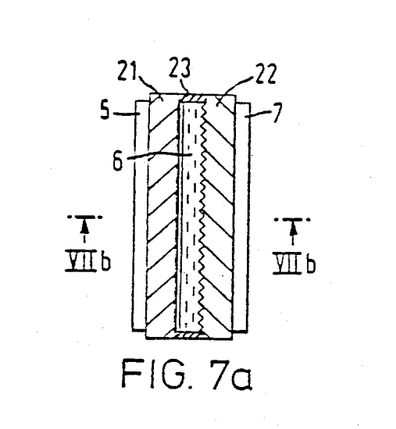
FIG. 7a is a cross-section of a "twisted-nematic" liquid-crystal mask.
Figure 7B:
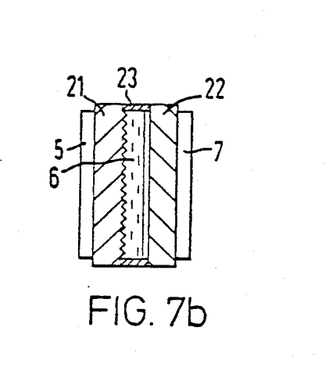
Figure 8:
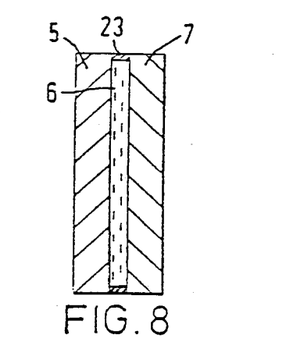
FIG. 8 is a cross-section of a cholesteric liquid-crystal mask.
Figure 9:
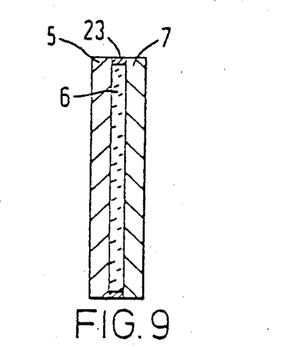
FIG. 9 is a cross-section of a nematic liquid-crystal mask.

FIGS. 7, 8 and 9 show three types of mask suitable for use in the credit cards of FIGS. 1 and 2 and FIG. 3. In FIGS. 7 and 8, 6 is the liquid crystal layer, 5 is the first polarising plate, 23 is a spacer, and 7 is the second polarising plate.

FIGS. 7a and 7b show the mask previously described in connection with FIGS. 1 to 3. If instead of nematic liquid-crystal, cholesteric liquid-crystal is placed between the plates 5, 7, the plates 21, 22 are omitted (FIG. 8). In this case, the thickness (5–20 μm) of the layer 6 should be such that the polarized light is rotated by 90°. It is important that the molecular axes and the axis of the electric dipole moment should be at an angle. The mode of operation is the same as in the case of the "twisted-nematic" liquid crystal of FIGS. 7a and 7b.

The structure of a simpler mask is shown in FIG. 9. In this mask, a 20–50 μm thick nematic crystal layer 6 coloured with a special dye is placed between two transparent plates 5, 7 of, for example, glass or plexiglass separated by a spacer 23. In the inert state, the random liquid-crystal molecules scatter the light and the layer 6 is not transparent. However, when the layer 6 is energized, the molecules turn on their axes of dipole moment towards the field and when the axis of the electric dipole moment corresponds with the axes of the molecules the layer 6 becomes transparent. The PEBAB-indophenol mixture has such a property. In the inert state, the mixture is dark blue. The structure of this mask is the simplest, because it does not require the polarizing plates of FIGS. 7 and 8. It is also the cheapest. The mask again can be used in both transmissive and reflective operations. In this mask, the layer 6 is not as thick as in the others, and therefore fits better to the shape of the credit card. In both operations there is a possibility of magnification or projection (transmission) of the image.

The great advantage of the masks of FIGS. 7 to 9 is that they can be used in the same viewer because all require the same energized field (perhaps the strength of the field may vary, but if the viewer is made for the highest requirement, it can also be set to lower strength). Thus, the masks are interchangeable, as far as the energized field is concerned.

A suitable structure of a viewer of the invention is shown by way of example in FIGS. 4,10,11 and 12. Its size, as well as its simple structure and handling makes the installation of the viewer possible on the spot where the credit cards are being checked. The inside structure of the viwer is determined by the type of credit cards to be identified. Since opaque plastics credit cards of the kind shown in FIGS. 1 and 2 are likely to become the most common, a reflective type operation is described in detail.

Figure 4:
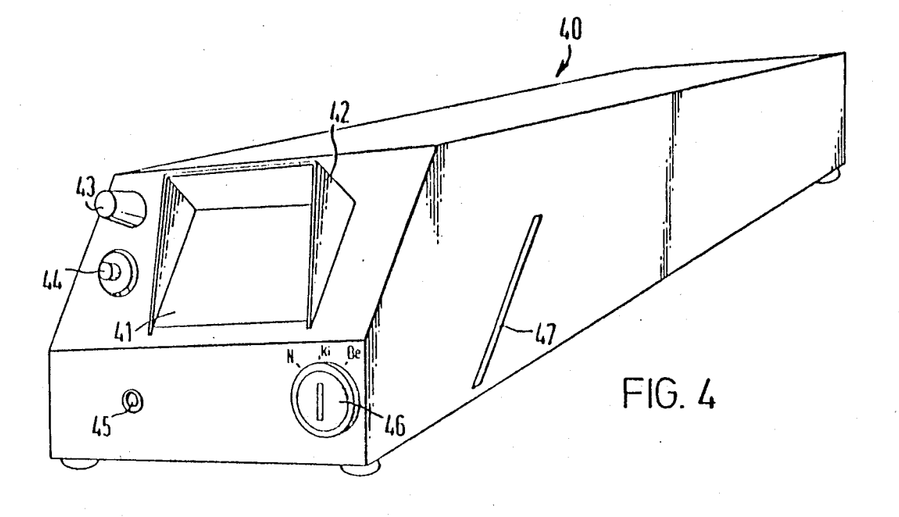
FIG. 4 is a perspective view of a viewer for use with the credit cards of FIGS. 1 and 2 and FIG. 3.

The viewer comprises a housing 40 having in its front wall a glass viewing window 41 which is partly surrounded by a viewing shade 42. A focussing control 43 for the internal optical system, a control switch 44 indicator lamp 45 and a key-operated switch 46 also are provided on the front wall. The switch 46 has three positions, namely "on", "off" and "repair". The significance of the "repair" position will be described later. A slot 47 is provided in a side wall of the housing 40 for the insertion and withdrawal of credit cards to be viewed in the viewer. At the rear of the housing 40, there are two fuse holders 48, 49 and a voltage selector switch 50 permitting the viewer to be operated in 110 V or 220 V 50/60 Hz.

Figure 10:
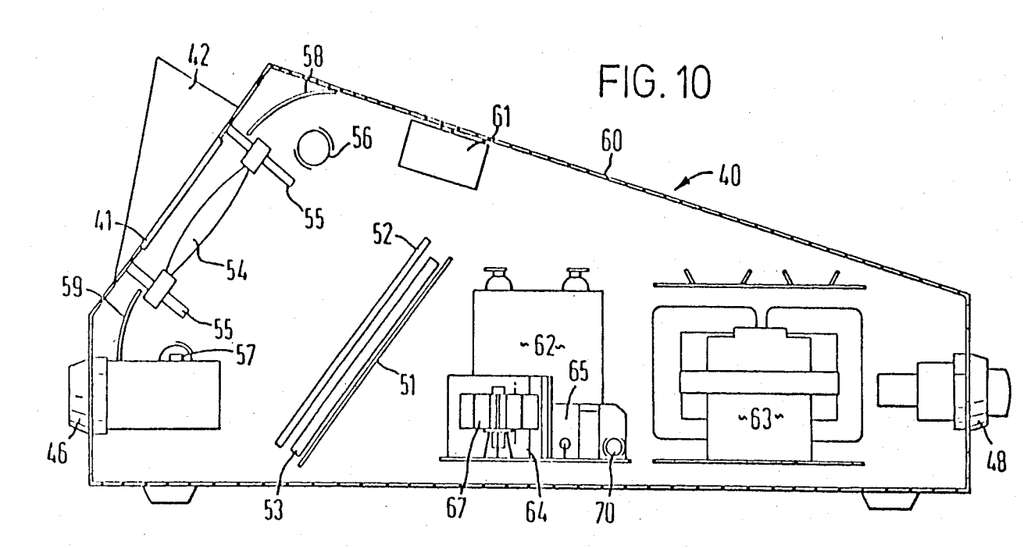
FIG. 10 is a side elevation of the internal components of the viewer of FIG. 4.
Figure 11:
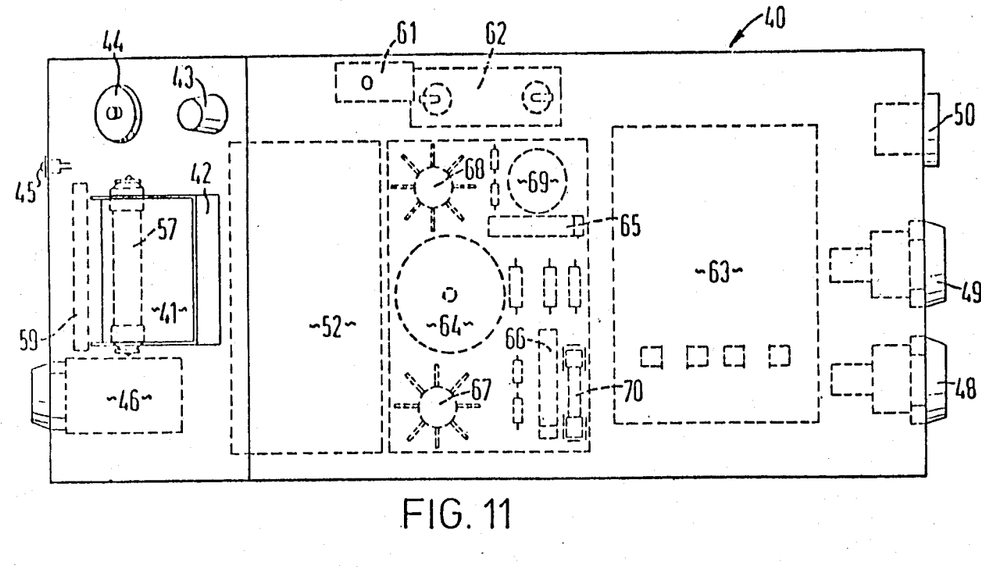
FIG. 11 is a plan view of the viewer of FIG. 4 with the top of the housing removed.

Within the housing 40, a pair of plate electrodes 51, 52 are arranged in a spaced parallel configuration to receive between them a credit card 53 inserted through slot 47. At least the electrode 52 facing the window 41 is transparent. The credit card 53 is viewed from the window 41 via a lens 54 mounted on supports 55 for focussing by means of the focussing control 43. Bulbs 56, 57 and respective concave mirrors 58, 59 are provided to illuminate the credit card 53 through the transparent electrode 52.

The top panel 60 of the housing 40 is removable to provide access to the interior for repair and/or adjustment. In order to prevent unauthorised tampering, a microswitch 61 is provided to be actuated upon removal of the top panel 60. Provided that the key operated switch 46 is in its "repair" position actuation of the microswitch 61 does not damage the electrical circuit of the viewer. However, if switch 46 is not in its "repair" position, actuation of the microswitch 61 short circuits a high voltage condenser 62 thereby rendering the viewer inoperable.

Figure 12:
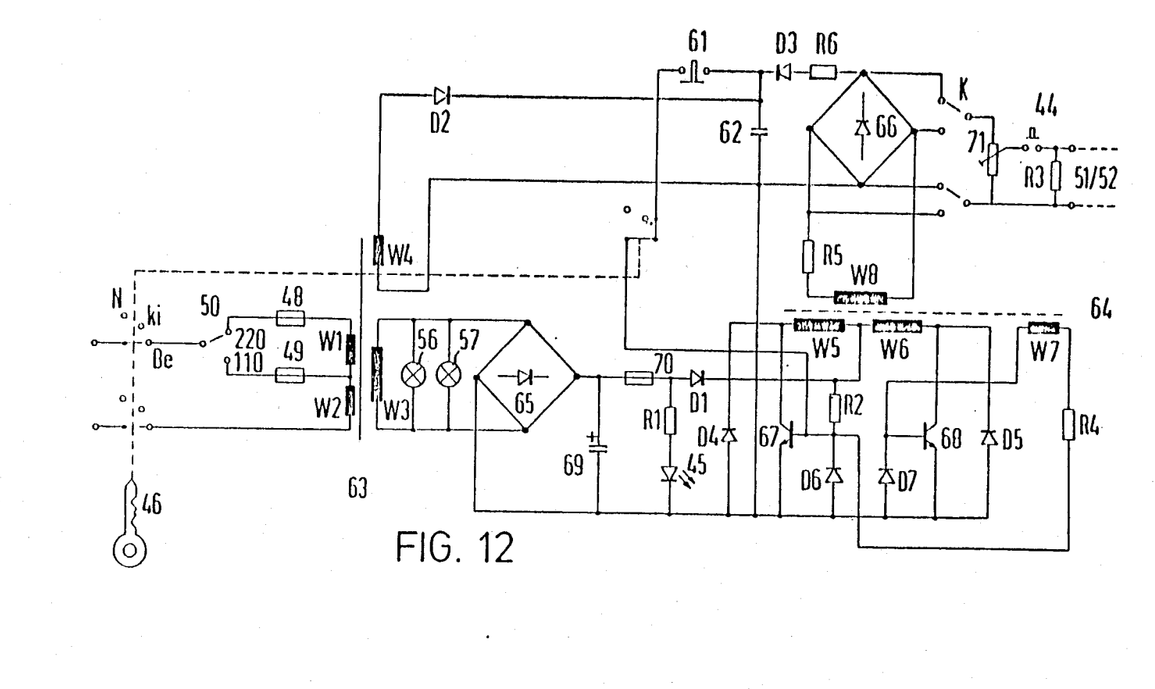
FIG. 12 is an electronic circuit diagram for the viewer of FIG. 4.

In addition to the circuit components referred to above, the electric circuit of the viewer includes transformers 63, 64; Graetz (rectifier bridges) 65, 66; transistors 67, 68; low voltage condenser 69; fuse 70; trimmer potentiometer 71; resistances R1 to R6; and diodes D1 to D7. In FIG. 12, the windings of transformer 63 are identified as W1 to W4 and those of transfer 64 are identified as W5 to W8.

The viewer can only be operated by inserting the correct key into switch 46 and turning that switch from the "off" position to the "on" position. In the "on" position, electric current from a supply to the viewer reaches the transformer 63, lights the bulbs 56, 57 operates the transistor high frequency inverter (constituted by items 64, 65, 67, R2, R4, D4, D5, D6 and D7), charges the condenser 62, but the electric field producing electrodes 51, 52 are not energized. For operation of the electrodes, the control switch 44 must also be pressed. After release of the switch 44, resistance R3 discharges the electrodes. Potentiometer 71 provides for adjustment of the voltage applied to the electrodes, thus altering the intensity of the field between them. On pressing of the control switch 44, the current reaches the electrodes and the mask of the credit card 53 placed between the electrodes becomes transparent. The necessary light for viewing the card is provided by the bulbs 56, 57. The information covered by the mask is magnified by the lens 54 and can be seen through the window 41 while the control switch remains pressed. By turning the focussing control 43 the lens 54 can be adjusted to give the sharpest image. After use the switch 46 is returned to its "off" position and the key removed.

Suitably, the circuit components have the following specifications:

Fuse 48: 0.16 A 250 V glasstube fuse
Fuse 49: 0.3 A 250 V glasstube fuse
Fuse 70: 0.4 A 250 V glasstube fuse
Transformer 68:
  W1;W2 1800 circuits,
  W3 200 circuits
  W4 3000 circuits $\phi$ 0.05 CuZ
  SU 39 b VAC on iron.
Transformer 64:
  W5;W6 100 circuits
  W7 50 circuits
  W8 3000 circuits $\phi$ 0.05 CuZ
  28×23 on iron core $A_L$ 3600
Bulbs 56,57: 12 V 5 W cylindrical bulbs
Graetz 65: B40 C 1500
Graetz 66: B800C 500
Condenser 69: 470 $\mu$F 25 V
Condenser 62: 4.7 $\mu$F 1000 V
Resistance R1: 1 k
Resistance R2: 47 k
Resistance R3: 10 M
Resistance R4: 2.7 k
Resistance R5: 1 k
Resistance R6: 47 k
Trimmer potentiometer 71: 470 k
Diodes D1, D2, D3: BY 238 (very small filtering current)
Diodes D4, D5, D6, D7: 1N4151
Transistors 67, 68: 2N 2218 A transistor with cooling system.

It will be appreciated that the invention is not restricted to the details described above but that numerous modifications and variations can be made without department from the scope of the invention as defined in the following Claims.

We claim:

1. An identity system comprising a plurality of flat laminated identity cards and a viewer therefor, each said identity card comprising an element bearing markings and a mask permanently overlying said markings and opaque so as to block said markings from view, the mask being of a material which, upon the application of a suitable electric field, changes from the opaque state to an energized state whereby the said markings can be viewed, and said viewer comprising a spaced pair of plate electrodes, means for supporting any of said identity cards between said electrodes, and means for applying an electrical field to the electrodes to energize the mask of said card to change from its opaque to its energized state, one at least of said electrodes being in the energized state whereby the revealed markings in the identity card can be viewed through said electrode.

2. An identity system as claimed in claim 1, wherein the mask comprises a liquid-crystal layer.

3. An identity system as claimed in claim 2, wherein the mask comprises a liquid-crystal layer sandwiched between a pair of polarizing plates.

4. An identity system as claimed in claim 3, wherein the liquid-crystal substance is a nematic liquid crystal substance and the plates have parallel grooves on their respective inner surfaces, the grooves in one plate being perpendicular to those in the other plate whereby the liquid crystal substance forms a twisted nematic layer.

5. An identity system as claimed in claim 3, wherein the liquid-crystal substance is a cholesteric liquid-crystal substance.

6. An identity system as claimed in claim 2, wherein the mask comprises a dye-containing liquid-crystal layer sandwiched between a pair of at least translucent plates.

* * * * *